(12) United States Patent
Suzuki

(10) Patent No.: US 11,893,447 B2
(45) Date of Patent: Feb. 6, 2024

(54) ARTICLE MANAGEMENT APPARATUS AND METHOD

(71) Applicant: TOSHIBA TEC KABUSHIKI KAISHA, Tokyo (JP)

(72) Inventor: Shigeaki Suzuki, Gotemba Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 17/584,136

(22) Filed: Jan. 25, 2022

(65) Prior Publication Data

US 2022/0398387 A1    Dec. 15, 2022

(30) Foreign Application Priority Data

Jun. 10, 2021    (JP) ................................ 2021-097562

(51) Int. Cl.
    *G06K 7/10*    (2006.01)
(52) U.S. Cl.
    CPC ..... *G06K 7/10099* (2013.01); *G06K 7/10138* (2013.01); *G06K 7/10237* (2013.01)

(58) Field of Classification Search
    None
    See application file for complete search history.

(56) References Cited

U.S. PATENT DOCUMENTS

| 9,934,414 | B1 * | 4/2018 | Lee ..................... G06K 7/10356 |
| RE47,599 | E * | 9/2019 | Dearing ................. G06Q 30/06 |
| 2019/0303631 | A1 * | 10/2019 | Ogawa ............... G06K 7/10108 |
| 2022/0398387 | A1 * | 12/2022 | Suzuki ............... G06K 7/10237 |

FOREIGN PATENT DOCUMENTS

JP    2005-178964 A    7/2005

\* cited by examiner

*Primary Examiner* — Fekadeselassie Girma
(74) *Attorney, Agent, or Firm* — FOLEY & LARDNER LLP

(57) ABSTRACT

An article management apparatus includes a processor configured to repeatedly acquire, at a predetermined interval, identification information from a radio tag attached to an article. The identification information is capable of identifying the article. The processor is also configured to track an elapsed reading time during which the identification information is repeatedly acquired. The processor is also configured to manage the elapsed reading time in association with the identification information.

14 Claims, 3 Drawing Sheets

| ID | ELAPSED READING TIME [h] | THRESHOLD ELAPSED TIME [h] | ACQUISITION TIME | | | | |
|---|---|---|---|---|---|---|---|
| | | | 9:30 | | 12:30 | 12:31 | 17:30 |
| 311 | 8 | 4 | ○ | | ○ | ○ | ○ |
| 312 | 3 | - | ○ | | ○ | - | - |
| 313 | 5 | 1 | - | | ○ | ○ | ○ |

ARTICLE MANAGEMENT APPARATUS AND METHOD

CROSS-REFERENCE TO RELATED APPLICATION

This application is based upon and claims the benefit of priority from Japanese Patent Application No. 2021-097562, filed on Jun. 10, 2021, the entire contents of which are incorporated herein by reference.

FIELD

Embodiments described herein relate to an article management apparatus and a method.

BACKGROUND

An apparatus is proposed in which a radio tag such as a radio frequency identifier (RFID) tag is attached to an article, and information stored in the radio tag is read to manage a state of the article. For example, a technique is proposed in which a best-before date of an article is stored in an RFID tag in advance, and a notification of an article whose best-before date is about to expire is made based on the read best-before date.

However, whether the best-before date past or the like, for example, how much time has elapsed since an article was placed in an environment, is hard to be known. Therefore, there is room for further improving state management of an article.

DETAILED DESCRIPTION

In general, according to at least one exemplary embodiment, an article management apparatus and a method capable of efficiently managing a state of an article are provided.

The article management apparatus according to at least one exemplary embodiment includes a processor configured to: repeatedly acquire, at a predetermined interval, identification information from a radio tag attached to an article, the identification information capable of identifying the article; track an elapsed reading time during which the identification information is repeatedly acquired; and manage the elapsed reading time in association with the identification information.

Hereinafter, an exemplary embodiment of an article management apparatus will be described in detail with reference to the drawings. The exemplary embodiment describes an example in which the article management apparatus is applied to a device for managing a state of a vaccine contained in a container such as a vial, but the exemplary embodiment is not limited to this aspect. In the following, the container containing the vaccine is simply referred to as the vaccine.

(Examples of Hardware Configurations of Article Management Apparatus)

Figure 1:
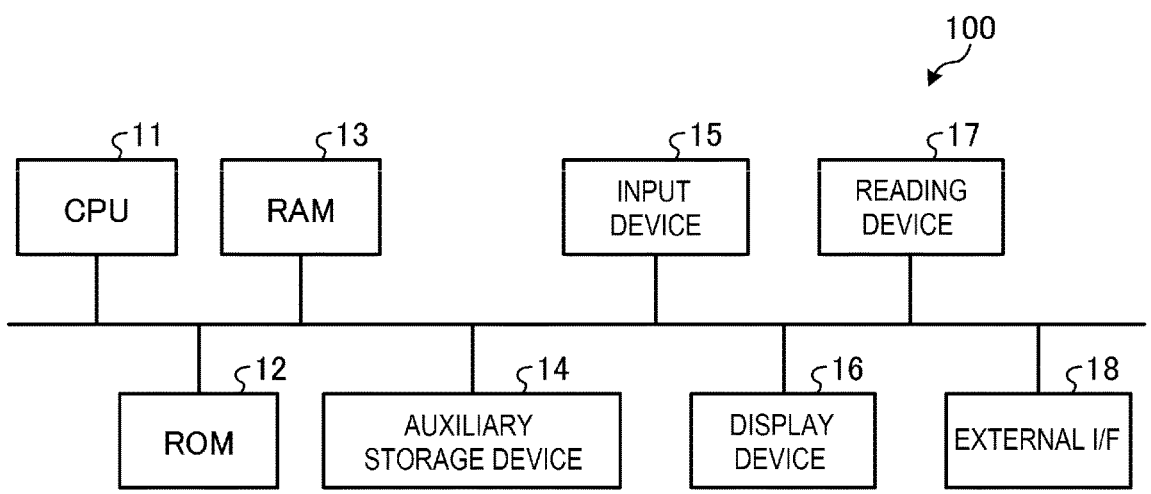
FIG. 1 is a block diagram illustrating at least one example hardware configuration of an article management apparatus, according to an exemplary embodiment.

As illustrated in FIG. 1, an article management apparatus 100 includes a central processing unit (CPU) 11 (e.g., a processor, etc.), a read only memory (ROM) 12, a random access memory (RAM) 13, an auxiliary storage device 14, an input device 15, a display device 16, a reading device 17, and an external interface (I/F) 18.

The CPU 11 is an arithmetic unit that implements each function of the article management apparatus 100 by reading a program or data stored in the ROM 12 or the auxiliary storage device 14 or the like into the RAM 13 and executing a process. The RAM 13 is a volatile memory used as a work area or the like of the CPU 11. The ROM 12 is a non-volatile memory.

The auxiliary storage device 14 is, for example, a recording device such as a hard disk drive (HDD) or a solid state drive (SSD), and records, for example, an operation system (OS), an application program, and various data.

The input device 15 is a device for a user who uses the article management apparatus 100 to perform various operations. The input device 15 includes, for example, a touch panel or a hardware key. The display device 16 is a display device that displays various pieces of information read by the reading device 17. The display device 16 is implemented by, for example, a liquid crystal display, and the input device 15 and the display device 16 may be integrally configured in a form such as a touch panel.

The reading device 17 is a device that reads, from radio tags attached to articles to be managed, that is, vaccines, identification information capable of identifying each of the articles, that is, each of the radio tags. For example, the reading device 17 is a radio tag reader and writer.

The radio tag reader and writer has an antenna, and detects a radio tag attached to an article existing within a communication region of the antenna. That is, the radio tag reader and writer transmits a radio wave from the antenna to a surrounding radio tag. When the radio tag receives the radio wave from the antenna, the radio tag transmits a response signal to the radio tag reader and writer.

The radio tag reader and writer receives the response signal from the radio tag and then reads tag information recorded in a memory of the radio tag. The tag information includes at least the above identification information. Further, the tag information may include a time as an index (for example, a threshold related to tracking a threshold elapsed time described later) from a viewpoint of quality control such as a durable life and an expiration date of an article. A method called anti-collision (collision prevention) is used for communication control between the radio tag reader and writer and the radio tag. As a result, when a plurality of radio tags exists in a communicable region of the antenna, tag information of the radio tags is collectively read by the radio tag reader and writer.

The radio tag includes a non-volatile memory inside. The memory is formed with an ID area for recording a unique identifier (ID) assigned and set by a manufacturer at a stage of manufacturing the radio tag, and a user area where the user can write any data.

In the present exemplary embodiment, the above identification information is written in the user area of the radio tag. The radio tag reader and writer reads the ID and the identification information from the radio tag as tag information. For example, the radio tag is the RFID.

The radio tag reader and writer is controlled such as to prevent duplicate reading of tag information (identification information) including the same ID by performing a duplicate check based on the ID included in the read tag information. In the article management apparatus 100, an article can be recorded based on the identification information read by the radio tag reader and writer.

The external I/F 18 is a communication interface for connecting the article management apparatus 100 to a network.

Figure 2:
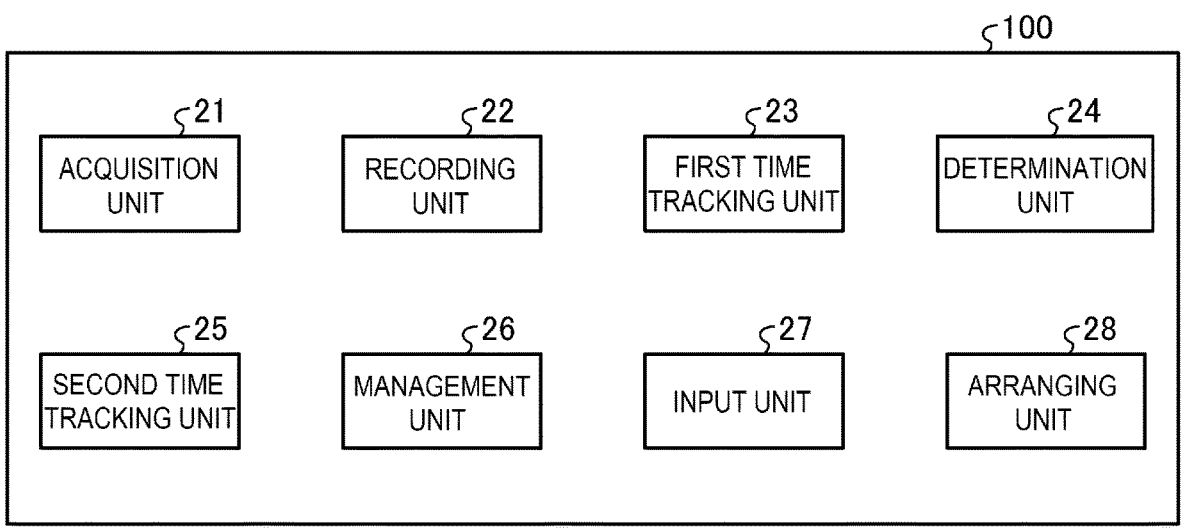
FIG. 2 is a block diagram illustrating an example of functions of the article management apparatus, according to an exemplary embodiment.

Next, a block diagram of the article management apparatus 100 according to an exemplary embodiment will be described. FIG. 2 is a block diagram illustrating an example of functional configurations of the article management apparatus 100. By operating the CPU 11 according to control programs recorded in the ROM 12 and the RAM 13, the article management apparatus 100 functions as an acquisition unit 21, a recording unit 22, a first time tracking unit 23, a determination unit 24, a second time tracking unit 25, a management unit 26, an input unit 27, and an arranging unit 28. Each of the above functional configurations may be implemented by hardware, and the article management apparatus 100 may include the above functions.

The acquisition unit 21 is an example of the acquisition unit. The acquisition unit 21 repeatedly acquires, from a radio tag attached to an article, identification information capable of identifying the article by cooperating with the reading device 17. For example, when the reading device 17 detects an article, the acquisition unit 21 operates the reading device 17 to start reading a radio tag and acquire identification information of the article read by the reading device 17.

The acquisition unit 21 repeatedly acquires the identification information recorded on the radio tag of the article from the reading device 17 at a predetermined time interval. The acquisition unit 21 can appropriately grasp a quality state of the article by repeatedly acquiring the information at the predetermined time interval. The predetermined time interval may be predetermined according to a characteristic of the quality state of the article, or the time interval may be determined by the user, and the time interval is not limited thereto.

The recording unit 22 is an example of a recording unit. Every time identification information is acquired by the acquisition unit 21, the recording unit 22 records the identification information in association with an acquisition date and time. Here, the acquisition date and time indicates a date and time acquired by the acquisition unit 21. The acquisition date and time can be acquired based on, for example, date and time information in which a time is tracked by a time tracking device such as a real-time clock (RTC) included in the article management apparatus 100.

The first time tracking unit 23 is an example of a time tracking unit. For each piece of the identification information acquired by the acquisition unit 21, the first time tracking unit 23 tracks a time during which the identification information is continuously acquired. Specifically, the first time tracking unit 23 tracks an elapsed reading time based on the acquisition date and time recorded by the recording unit 22.

Figures 3, 4:
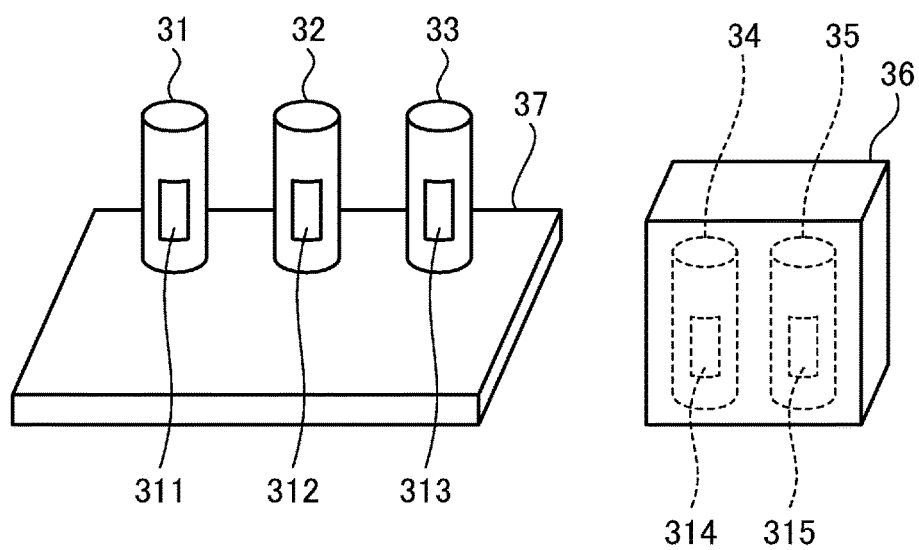
FIG. 3 is a schematic configuration diagram illustrating an example in which the article management apparatus reads an article, according to an exemplary embodiment.
FIG. 4 is a diagram illustrating an example of a table in which the article management apparatus records information on the article, according to an exemplary embodiment.

Here, with reference to FIG. 3, an exemplary method for the article management apparatus 100 to acquire information on the radio tag attached to the article will be described. FIG. 3 is a schematic diagram illustrating an example configuration in which the article management apparatus 100 reads an article. FIG. 3 illustrates vaccines (31, 32, 33, 34, 35), a container 36, and a placement table 37, which are examples of the article.

The vaccines (31, 32, 33, 34, 35) are tagged with radio tags (311, 312, 313, 314, 315), respectively. The container 36 contains the vaccines (34, 35) and manages the vaccines (34, 35) in an appropriate quality state. For example, the container 36 is a freezer. The vaccines (31, 32, 33) taken out from the container 36 are placed on the placement table 37. The placement table 37 includes the antenna of the reading device 17 inside or below the placement table 37. The vaccines placed on the placement table 37 are maintained at a room temperature.

In the case of FIG. 3, the acquisition unit 21 repeatedly acquires, from the radio tags (311, 312, 313) attached to the vaccines (31, 32, 33) placed on the placement table 37, identification information capable of identifying an article by cooperating with the radio tag reader and writer. For example, the acquisition unit 21 operates the radio tag reader and writer to repeatedly read the radio tag at the predetermined time interval (for example, 1-minute interval), and acquires the read tag information (identification information) every time.

FIG. 4 is a diagram illustrating an example of a table in which the article management apparatus 100 records the article. The table is stored in the RAM 13 or the auxiliary storage device 14 of the article management apparatus 100.

As illustrated in FIG. 4, for each ID which is the identification information capable of identifying the articles, the table stores a time at which the ID is acquired. Here, the time stored (recorded) in the table corresponds to the acquisition date and time at which the acquisition unit 21 acquires the tag information. When the acquisition unit 21 acquires the tag information, the recording unit 22 records the acquisition date and time (time) in the table in association with the identification information (ID) included in the tag information. In the example of FIG. 4, the acquisition unit 21 acquires the tag information at the 1-minute interval.

The first time tracking unit 23 tracks, for each piece of the identification information, the time during which the identification information is continuously acquired based on the acquisition dates and time recorded in the table.

Here, an act of the first time tracking unit 23 will be described with reference to FIGS. 3 and 4. For example, it is assumed that the vaccine 31 and the vaccine 32 are taken out from the container 36 at 9:30 and placed on the placement table 37 until 17:30. In this case, the acquisition unit 21 continuously acquires the tag information from the radio tags attached to the vaccine 31 and the vaccine 32 from 9:30 to 17:30, and thus a recording result by the recording unit 22 is illustrated in FIG. 4. Here, an ID 311 means an ID of the radio tag attached to the vaccine 31, and an ID 312 means an ID of the radio tag attached to the vaccine 32.

In the case of the state in the table illustrated in FIG. 4, the first time tracking unit 23 tracks 8 hours as the elapsed reading time for the ID 311 based on a time length of the acquisition time (9:30 to 17:30) recorded in association with the ID. The first time tracking unit 23 tracks 3 hours as the elapsed reading time for the ID 312 based on a time length of the acquisition time (9:30 to 12:30) recorded in association with the ID. The first time tracking unit 23 records the tracked elapsed reading times in the table. The recording method may be stored in a place other than the table and is not limited thereto.

In some embodiments, the elapsed reading time is updated every time the first time tracking unit 23 tracks the time, that is, every time the tag information is acquired by the acquisition unit 21. When the ID recorded in the table cannot be read because the elapsed reading time is being repeatedly updated, time tracking of the elapsed reading time may be stopped or continued. For example, in the former case, the elapsed reading time may be reset. In the latter case, when a period in which reading is interrupted reaches a predetermined time, the time tracking of the elapsed reading time may be stopped, or a record of the corresponding ID may be deleted from the table.

Returning to FIG. 2, the determination unit 24 is an example of a determination unit. The determination unit 24 determines whether the acquisition time acquired by the acquisition unit 21 exceeds a threshold. Specifically, the determination unit 24 compares a preset threshold with the elapsed reading time tracked by the first time tracking unit 23, and determines whether the elapsed reading time of the vaccine placed on the placement table 37 exceeds the threshold.

The threshold preferably sets a time for storage at the room temperature, which is an upper limit value (or a lower limit value) for controlling a quality of the vaccine. In the present exemplary embodiment, the threshold is, for example, a time (4 hours) during which the vaccine is thawed. The threshold can be optionally set and is not limited thereto.

The second time tracking unit 25 is an example of the time tracking unit. When the elapsed reading time tracked by the first time tracking unit 23 exceeds the threshold, the second time tracking unit 25 tracks the threshold elapsed time during which the threshold is exceeded. Specifically, when the determination unit 24 determines that the threshold is exceeded, the second time tracking unit 25 tracks the time during which the threshold is exceeded.

Here, with reference to FIG. 4, an act of the second time tracking unit 25 will be described. In the case of the table illustrated in FIG. 4, the second time tracking unit 25 compares the elapsed reading time recorded in association with the ID 311 with the threshold (for example, 4 hours). When the elapsed reading time exceeds the threshold, the time tracking of the threshold elapsed time is started from a time (13:30) at which the threshold is exceeded. For example, when 17:30 is reached, the second time tracking unit 25 tracks 4 hours as the threshold elapsed time based on the time length from 13:30 to 17:30.

In some embodiments, the second time tracking unit 25 also compares an elapsed reading time recorded in association with the ID 313 with the threshold (4 hours), and when detecting that the threshold is exceeded at 16:30, starts tracking the threshold elapsed time from 16:30. For example, when 17:30 is reached, the second time tracking unit 25 tracks 1 hour as the threshold elapsed time based on a time length from 16:30 to 17:30. The threshold related to the elapsed reading time may be stored in advance in the auxiliary storage device 14 or the like, or may be configured to be specified by the user via the input unit 27 or the like described later.

As described above, since the threshold is 4 hours, regarding the ID 311, the determination unit 24 determines that a state of the vaccine 31 stored at the room temperature exceeds the threshold at 13:30. Regarding the ID 313, the determination unit 24 determines that a state of the vaccine 33 stored at the room temperature exceeds the threshold at 16:30. The second time tracking unit 25 starts tracking times exceeding the threshold according to the determination results of the determination unit 24.

In some embodiments, the threshold elapsed times tracked by the second time tracking unit 25 are recorded in the table. The recording method may be stored in a place other than the table and is not limited thereto. The threshold elapsed time is updated every time the second time tracking unit 25 tracks the time, that is, every time the tag information is acquired by the acquisition unit 21.

In the present exemplary embodiment, the first time tracking unit 23 and the second time tracking unit 25 are separated from each other, but one time tracking unit may be configured to take on the functions of the first time tracking unit 23 and the second time tracking unit 25.

Returning to FIG. 2, the management unit 26 is an example of a management unit. The management unit 26 manages the elapsed reading time tracked by the first time tracking unit 23 in association with the identification information. The management unit 26 manages the vaccine based on the elapsed reading time tracked by the first time tracking unit 23 and the threshold elapsed time tracked by the second time tracking unit. The managing method may be other than the table, and is not limited thereto. The management unit 26 displays the table on the display device 16 in response to an act of the user via the input device 15.

In some embodiments, the management unit 26 displays the elapsed reading time tracked by the first time tracking unit 23 and the threshold elapsed time tracked by the second time tracking unit 25 on the display device 16 for each piece of the identification information. The management unit 26 displays the identification information and the threshold elapsed time in association with each other on the display device 16. For example, the management unit 26 takes a 2-axis graph as an example of a time tracking change, makes a horizontal axis as the time acquired by the acquisition unit 21, makes a vertical axis as the threshold elapsed time tracked by the second time tracking unit 25, and displays, on the display device 16, the 2-axis graph for each piece of the identification information.

In some embodiments, the management unit 26 notifies the display device 16 when the second time tracking unit 25 starts tracking the time. For example, when the threshold is exceeded, the management unit 26 displays, on the display device 16, a warning that "since the threshold elapsed time is exceeded, please check the vaccine.", and highlights the ID of the corresponding vaccine on the display device 16. The notifying method may be other than displaying on the display device 16, and is not limited thereto. When the user confirms a content to be notified, the management unit 26 does not have to notify the user again, and the number of times for notifying may be set by setting a separate threshold.

The input unit 27 is an example of an input unit. The input unit 27 cooperates with the input device 15 to operate items of the identification information, the acquisition date and time, the elapsed reading time, and the threshold elapsed time selected by the user in the table. The user uses the input unit 27 when the user wants to change the item displayed on the display device 16 or when the user wants to change the threshold set by the article management apparatus 100. For example, when the user changes an item to be displayed on the display device 16 by the management unit 26, the user inputs the changed item to the input unit 27. When the user wants to change the threshold, the user inputs the changed threshold to the input unit 27.

The arranging unit 28 is an example of an arranging unit. According to an act of the user, the arranging unit 28 sorts a display order of information (the acquisition date and time, the elapsed reading time, the threshold elapsed time) related to each piece of the identification information displayed on the display device 16 by the management unit 26. For example, the arranging unit 28 sorts the display order such that information in which the elapsed reading time is long is displayed at the top. For example, the arranging unit 28 sorts the display order such that information in which the threshold elapsed time is long is displayed at the top. As a result, the identification information in which the elapsed reading time or the threshold elapsed time is long can be easily recognized, so that convenience of article management can be improved.

Whichever of the elapsed reading time and the threshold elapsed time that is preferred to be displayed can be optionally set, but from the viewpoint of the quality control, the information in which the threshold elapsed time is long is preferably displayed at the top.

The arranging unit 28 may sort the information displayed on the display device 16 according to the act of the user via the input unit 27. For example, when the user wants to sort by the time during which the threshold is exceeded, the arranging unit 28 sorts in a descending order in which the time during which the threshold is exceeded is long. The arranging method can be optionally set, and is not limited thereto. A function of the arranging unit 28 may be implemented by the management unit 26.

Figure 5:
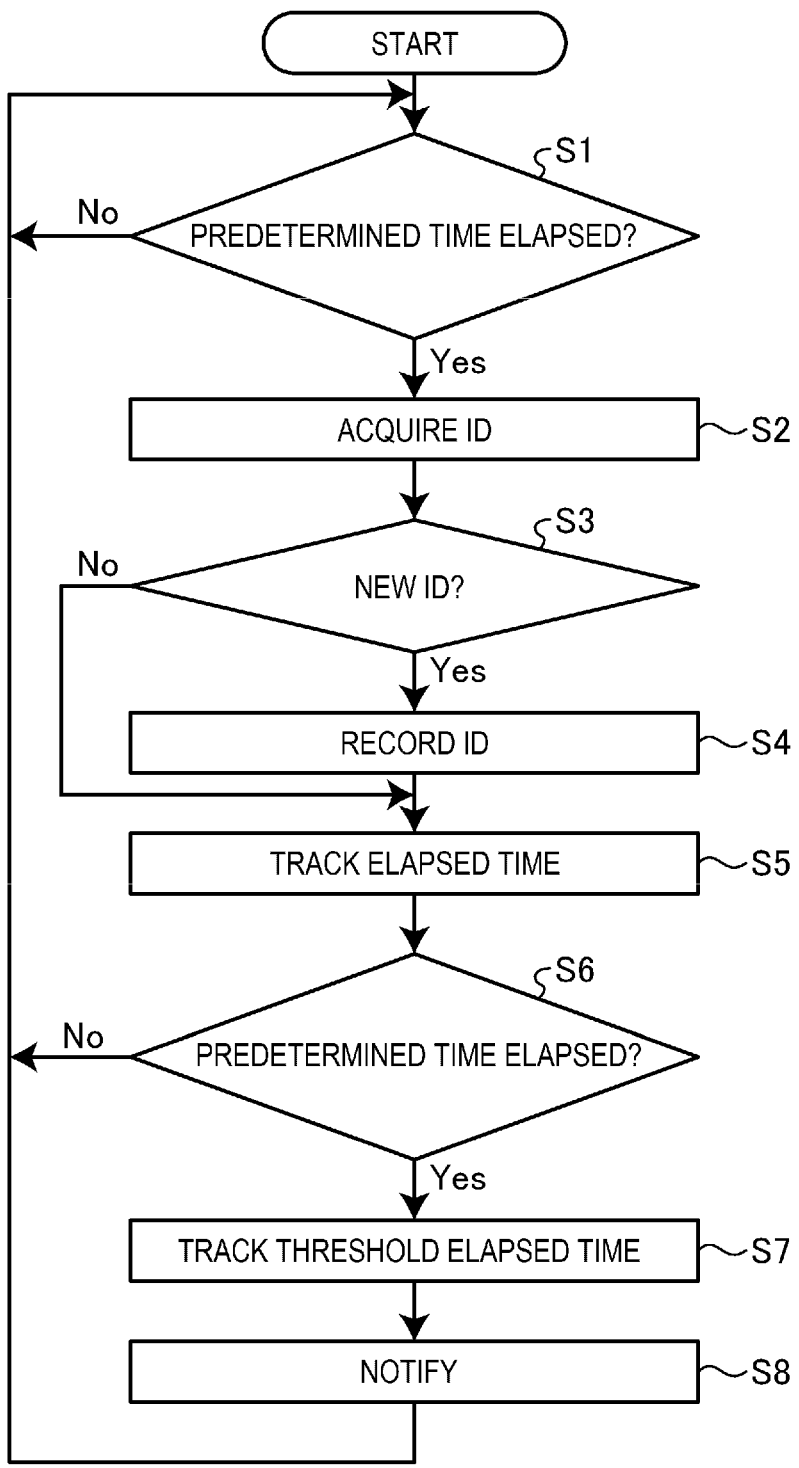
FIG. 5 is a flowchart illustrating an example of a process executed by the article management apparatus, according to an exemplary embodiment.

Next, an exemplary method of the article management apparatus 100 having the above configuration will be described with reference to FIG. 5. FIG. 5 is a flowchart illustrating an example of a process executed by the article management apparatus 100.

The acquisition unit 21 determines whether the predetermined time (for example, 1 minute), which is the time interval for acquiring the tag information, has elapsed. If the predetermined time has elapsed (Act 1: Yes), the process proceeds to Act 2. If the predetermined time has not elapse (Act 1: No), the process is returned to Act 1 again to wait until the predetermined time has elapsed.

Subsequently, the acquisition unit 21 acquires the tag information including the identification information (ID) from the radio tags attached to the respective articles (Act 2). When the acquisition is performed, the process proceeds to Act 3.

The recording unit 22 determines whether the acquired ID is anew ID that is not recorded in the table. If the acquired ID is new (Act 3: Yes), the recording unit 22 records the new ID in the table (Act 4), and the process proceeds to Act 5. If the acquired ID was registered in the table (Act 3: No), the process proceeds to Act 5.

Subsequently, the first time tracking unit 23 tracks the time for the ID acquired by the acquisition unit 21 (Act 5). When the time is tracked, the first time tracking unit 23 records the tracked time. When the recording is performed, the management unit 26 manages the tracked time in association with the identification information.

Then, the determination unit 24 determines whether the elapsed reading time tracked by the first time tracking unit 23 exceeds the threshold (Act 6). If the tracked elapsed reading time exceeds the threshold (Act 6: Yes), the process proceeds to Act 7. If the tracked elapsed reading time does not exceed the threshold (Act 6: No), the process returns to Act 1.

When the determination unit 24 determines that the threshold is exceeded, the second time tracking unit 25 tracks the threshold elapsed time during which the threshold is exceeded (Act 7). When the time is tracked, the second time tracking unit 25 records the tracked time. When the recording is performed, the management unit 26 manages the vaccine by associating the elapsed reading time tracked by the first time tracking unit 23 with the threshold elapsed time tracked by the second time tracking unit 25 for each piece of the identification information.

Subsequently, the management unit 26 makes a notification that a state of the vaccine stored at, for example, room temperature exceeds the threshold (Act 8). The management unit 26 notifies the display device 16 of the identification information in which the display order is sorted such that the information in which the threshold elapsed time is long is displayed at the top by the arranging unit 28. When the notification is made, the process is returned to Act 1 again to wait until the predetermined time elapses.

As described above, in the article management apparatus 100 according to the present exemplary embodiment, the acquisition unit 21 repeatedly acquires the identification information of the article from the radio tag attached to the article. The first time tracking unit 23 tracks the time at which the identification information is acquired. The management unit 26 manages the tracked elapsed reading time in association with the identification information.

Accordingly, the time during which the article is acquired is tracked, and the tracked time is managed in association with the identification information. Since the article management apparatus 100 can grasp the state of the article from the managed information, the state of the article can be efficiently managed.

The above-described exemplary embodiment can be appropriately modified and implemented by changing a part of the configuration or function of the above apparatus. Therefore, hereinafter, modified and nonlimiting examples relating to the above exemplary embodiment will be described as other embodiments. Hereinafter, differences from the exemplary embodiment will be mainly described, and detailed descriptions will be omitted with respect to similarities to the content already explained. Further, the modified and nonlimiting examples described below may be implemented individually or in combination as appropriate.

(First Modification)

In the above exemplary embodiment, the article to be managed is the vaccine, but the article is not limited thereto. For example, the article to be managed may be fresh food or the like. For example, the container may be a refrigerator or a tray or the like for storing the fresh food or the like. A place where the article management apparatus 100 is applied is not limited to a medical field, and may be a store selling the fresh food or a backyard of the store or the like.

(Second Modification)

In the above exemplary embodiment, the vaccine, which is the article to be managed, is attached with the radio tag. However, for example, the container 36 may be attached with a radio tag. In this case, the placement table 37 of the article management apparatus 100 is provided at a place where the container 36 is placed, and an elapsed time since placing the container 36 at the place is tracked. For example, in a store such as a convenience store, a tray or the like containing a product requiring refrigeration may be placed in a room where temperature control is not performed, and in such a case, by providing the placement table 37 at a place where the tray is placed, an elapsed time since placing the tray at that place can be managed.

(Third Modification)

In at least one exemplary embodiment, the identification information stored in the radio tag may be written on the article itself such as the vaccine. Therefore, the article in the state where the threshold is exceeded can be easily confirmed.

(Fourth Modification)

In the above exemplary embodiment, a notification of the content to be notified is made to the display device 16 of the article management apparatus 100. However, for example, an information processing terminal owned by the user may be notified. Accordingly, the user can manage the article even if the user is away from a place where the article is supervised.

(Fifth Modification)

In the above exemplary embodiment, the reading device 17 is provided in the placement table. However, for example, the reading device 17 may be provided in a place other than the placement table, and the reading device 17 is not limited thereto. The reading device 17 may be arranged in a place where the radio tag can be read, and may be arranged, for example, on a wall or ceiling in a room where the article is stored.

(Sixth Modification)

In the above exemplary embodiment, the first time tracking unit 23 stores the reading time in the table. However, for example, the recording unit 22 may record the reading time in the table. The second time tracking unit 25 stores the reading time in the table, but in some embodiments, the recording unit 22 may record the reading time in the table.

(Seventh Modification)

In the above exemplary embodiment, the second time tracking unit 25 is configured to start tracking the threshold elapsed time based on the threshold set in advance in the auxiliary storage device 14 or the like, but the threshold for reference is not limited thereto. For example, when the tag information includes the threshold, based on the threshold included in the tag information acquired by the acquisition unit 21, the second time tracking unit 25 may track the threshold elapsed time for the identification information included in the tag information. Accordingly, the second time tracking unit 25 can switch the threshold (time) for starting tracking the threshold elapsed time for each piece of the identification information, so that the threshold elapsed time can be set individually for each type of the vaccines, for example.

In at least one exemplary embodiment, a computer program executed by the article management apparatus 100 is provided by being recorded, as a file in an installable or executable format, on a computer-readable recording medium such as a CD-ROM, a flexible disk (FD), a CD-R, a digital versatile disk (DVD).

In at least one exemplary embodiment, the computer program executed by the article management apparatus 100 may be provided by being stored on a computer connected to a network such as an Internet, and being downloaded via the network. The computer program executed by the article management apparatus 100 of the present embodiment may be provided or distributed via the network such as the Internet.

In at least one exemplary embodiment, the computer program executed by the article management apparatus 100 may be provided by being incorporating in a ROM or the like in advance.

The exemplary embodiment described above is presented as an example and is not intended to limit the scope of the present disclosure. Indeed, the exemplary embodiment described herein may be implemented in a variety of other forms: furthermore, various omissions, substitutions, and changes in the forms of the embodiments described herein may be made without departing from the spirit of the disclosure. The embodiments and the modifications thereof are included in the scope and gist of the disclosure, and are also included in the invention described in the claims and equivalents thereof.

What is claimed is:

1. An article management apparatus comprising a processor configured to:
   repeatedly acquire, at a predetermined interval, identification information from a radio tag attached to an article, the identification information identifying the article;
   track an elapsed reading time during which the identification information is repeatedly acquired; and
   manage the elapsed reading time in association with the identification information.

2. The apparatus according to claim 1, wherein the processor is further configured to:
   record, each time the identification information is repeatedly acquired, the identification information, the elapsed reading time, and an acquisition date and time of the identification information, wherein
   the elapsed reading time is tracked based on the recorded acquisition date and time.

3. The apparatus according to claim 2, wherein the processor is further configured to:
   compare the elapsed reading time with a threshold; and
   track, in response to the elapsed reading time exceeding the threshold, a threshold elapsed time based on the threshold.

4. The apparatus according to claim 3, wherein the processor is further configured to:
   output a notification when the article management apparatus starts tracking the threshold elapsed time.

5. The apparatus according to claim 3, wherein the processor is further configured to:
   display, for each acquired identification information, the acquisition date and time, the elapsed reading time, and the threshold elapsed time.

6. The apparatus according to claim 3, wherein the threshold is one of an upper or lower limit storage time associated with a state of the article, a value stored in advance, or an input provided during article management.

7. The apparatus according to claim 1, wherein the processor is further configured to:
   perform a duplicate check of a unique identifier of the radio tag to prevent duplicate reading of the identification information.

8. The apparatus according to claim 1, wherein the predetermined time interval is associated with a characteristic of a quality state of the article.

9. A non-transitory computer readable medium configured to store instructions, which, when executed by a processor, cause operations to be carried out, the operations comprising:
   repeatedly acquiring, at a predetermined interval, identification information from a radio tag attached to an article, the identification information identifying the article;
   tracking an elapsed reading time during which the identification information is repeatedly being acquired; and
   managing the elapsed reading time in association with the identification information.

10. A method for managing a state of an article using an article management apparatus having a processor, the method comprising:

repeatedly acquiring, at a predetermined interval, identification information from a radio tag attached to an article, the identification information capable of identifying the article;

tracking an elapsed reading time during which the identification information is repeatedly being acquired; and managing the elapsed reading time in association with the identification information.

11. The method according to claim 10, further comprising:

determining whether a predetermined time has elapsed; and determining, after acquiring identification information, whether an acquired unique identifier, associated with the article, is already recorded.

12. The method according to claim 10, further comprising:

recording, each time the identification information is repeatedly acquired, the identification information, the elapsed reading time, and an acquisition date and time of the identification information, wherein the elapsed reading time being tracked based on the recorded acquisition date and time.

13. The method according to claim 12, further comprising:

comparing the elapsed reading time with a threshold; and tracking, in response to the elapsed reading time exceeding the threshold, a threshold elapsed time based on the threshold.

14. The method according to claim 10, wherein repeatedly acquiring identification information includes repeatedly acquiring identification information, collectively, from a plurality of radio tags.

* * * * *